US008285907B2

(12) United States Patent
Chappell et al.

(10) Patent No.: US 8,285,907 B2
(45) Date of Patent: Oct. 9, 2012

(54) PACKET PROCESSING IN SWITCHED FABRIC NETWORKS

(75) Inventors: Christopher L. Chappell, Chandler, AZ (US); James Mitchell, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1667 days.

(21) Appl. No.: 11/009,391

(22) Filed: Dec. 10, 2004

(65) Prior Publication Data

US 2006/0206655 A1 Sep. 14, 2006

(51) Int. Cl.
*G06F 13/14* (2006.01)
(52) U.S. Cl. ......... 710/305; 710/306; 710/309; 710/310
(58) Field of Classification Search ............ 710/62, 710/64–65, 72, 106, 305–306, 309–316, 710/240, 242; 370/392, 401
See application file for complete search history.

(56) References Cited

U.S. PATENT DOCUMENTS

| | | | |
|---|---|---|---|
| 6,798,743 | B1 | 9/2004 | Ma et al. |
| 7,046,668 | B2 * | 5/2006 | Pettey et al. ................ 370/392 |
| 2004/0128410 | A1 * | 7/2004 | Mayhew et al. ............... 710/30 |
| 2005/0041658 | A1 * | 2/2005 | Mayhew et al. ............. 370/389 |
| 2005/0157754 | A1 * | 7/2005 | Pettey ........................... 370/469 |
| 2005/0262269 | A1 * | 11/2005 | Pike ................................ 710/1 |
| 2005/0270988 | A1 * | 12/2005 | DeHaemer .................... 370/254 |
| 2006/0018341 | A1 * | 1/2006 | Pettey et al. .................. 370/465 |

FOREIGN PATENT DOCUMENTS

| | | |
|---|---|---|
| JP | 2001-326687 | 11/2001 |
| WO | WO2004/047384 | 6/2004 |

OTHER PUBLICATIONS

The Design of PCI Express for Future Communication Platform, Hyun et al., IEEE 2004.*
PCI Express and Advanced Switching: Evolutionary Path to Revolutionary Architectures, Mayhew et al.*
Advanced Switching Boots PCI Express, Pranav Mehta, http://www.commsdesign.com, Oct. 2002.*
Advanced Switching is Protocol-Agnostic, Solomon, http://www.commsdesign.com, Apr. 2004.*
Advanced Switching Technology, Tech Brief, ASI SIG, http://www.asi-sig.org.*
Introduction to Advanced Switching Protocol Encapsulation and PI-8, ASI SIG, http://www.asi-sig.org.*
Advanced Switching Versus PCI-Express for Peer-to-Peer Communications, Chiang, Vitesse Semiconductor Corp.*

(Continued)

*Primary Examiner* — Khanh Dang
(74) *Attorney, Agent, or Firm* — Blakely, Sokoloff, Taylor & Zafman LLP

(57) ABSTRACT

Methods and apparatus, including computer program products, implementing techniques for forming an Advanced Switching (AS) packet by applying AS path binding information to a packet received over a Peripheral Component Interconnect-Express (PCIe) fabric according to a downstream port identifier associated with the packet, and sending the AS packet to an AS fabric. Methods and apparatus, including computer program products, implementing techniques for processing an AS packet received over an AS fabric by comparing an AS payload of the AS packet with one or more memory spaces associated with port identifiers, determining whether the AS payload comprises a base packet to be transmitted to the PCIe fabric based on the comparison, and if so, removing an AS header from the AS packet to reveal the base packet.

16 Claims, 4 Drawing Sheets

OTHER PUBLICATIONS

PCI Express and Advanced Switching: Data Movement Protocols, COST Journal, Oct. 2003.*

Advanced Switching Architecture, Solomon et al., Intel Developer Forum, Sep. 17, 2003.*

Digging Into Advanced Switching Spec, CommsDesign, Apr. 2003.*

Gudmundson, J., "Connect PCI Express Subsystems with Advanced Switching Fabrics", *Electronic Design* [*Online*], pp. 1-8, May 2004, Retrieved from Internet: <URL:http://www.elecdesign.com/Articles/ArticleID/7895/7895.html>.

Mayhew, D., et al., "PCI Express and Advanced Switching: Evolutionary Path to Building Next Generation Interconnects", *IEEE: Proc. of the 11$^{th}$ Symposium on High Performance Interconnects*, Piscataway, NJ, USA, pp. 21-29, Aug. 20-22, 2003.

*PCI Express System Architecture*, "PCI Express Configuration Architecture", Addison-Wesley, USA, pp. 30, 48-51, and 712, Sep. 2003.

Solomon, G., et al., "Advanced Switching Architecture", *Intel Developer Forum*, pp. 1-53, Sep. 2003.

\* cited by examiner

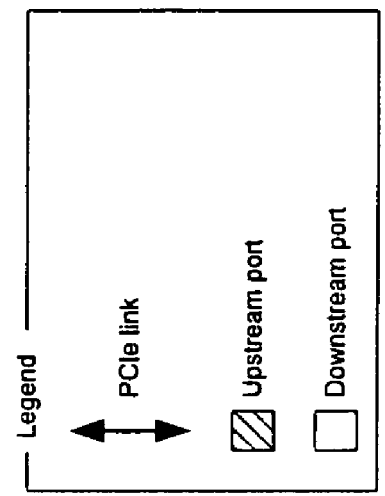
FIG. 1a (Prior art)
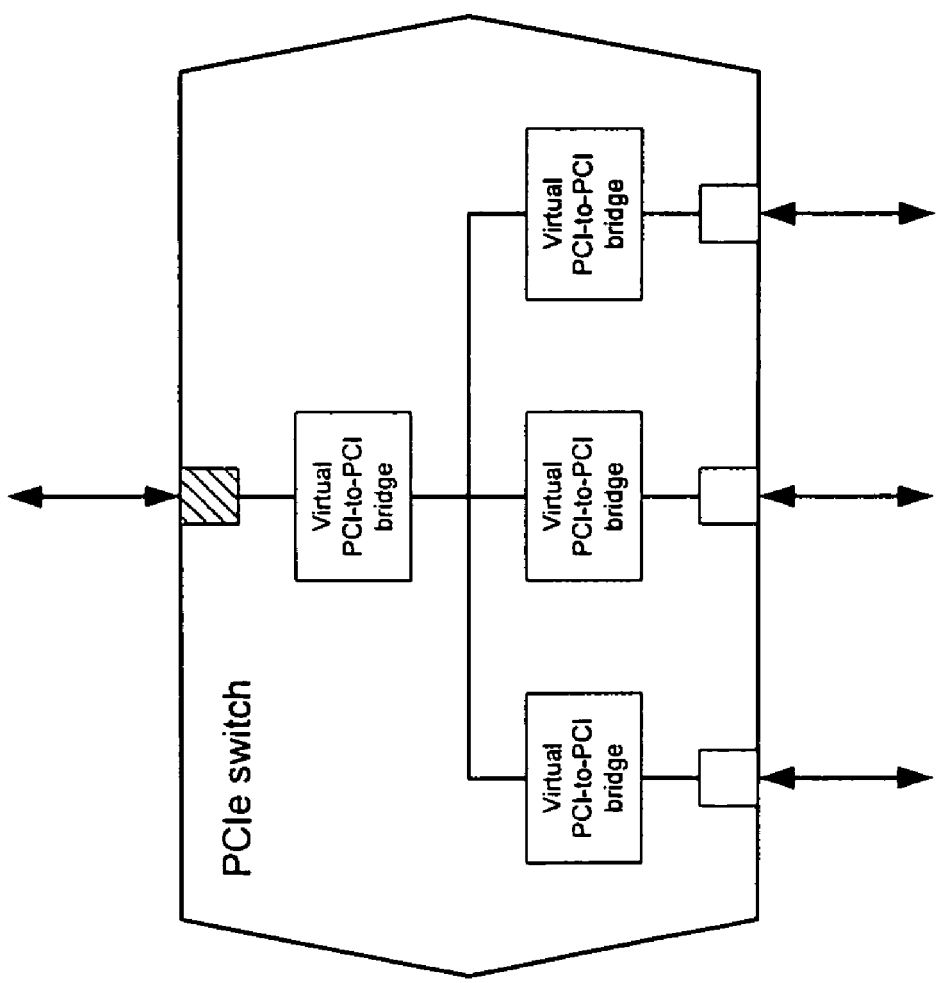

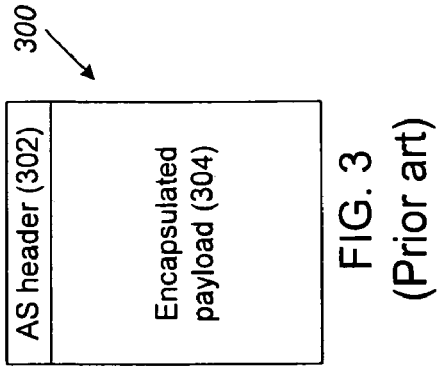
FIG. 2a
(Prior art)
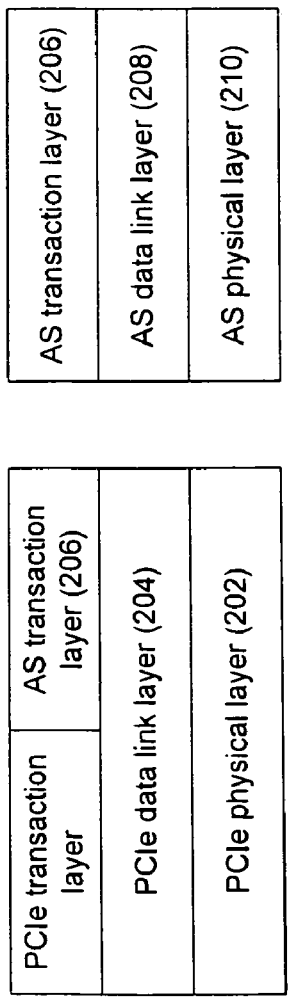
FIG. 2b
(Prior art)
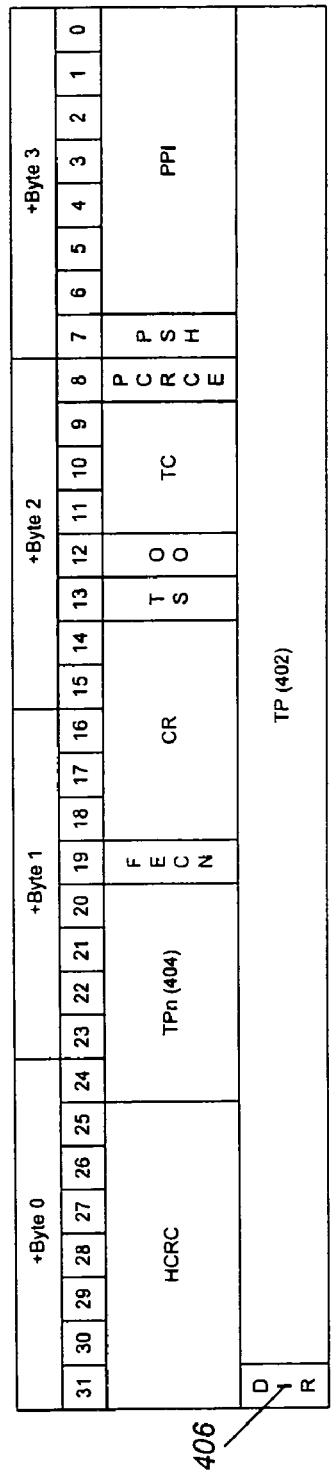
FIG. 3
(Prior art)
FIG. 4 (Prior art)
PPI = Primary PI
PSH = Perishable
PCRCE = Packet CRC Enable
TC = Traffic Class
OO = Ordered Only
TS = Type Specific
CR = Credits Required
TPn = Turn Pointer
HCRC = Header CRC
TP = Turn Pool
DIR = Direction

PACKET PROCESSING IN SWITCHED FABRIC NETWORKS

BACKGROUND

This invention relates to packet processing in switched fabric networks.

PCI (Peripheral Component Interconnect) Express is a serialized I/O interconnect standard developed to meet the increasing bandwidth needs of the next generation of computer systems. The PCI Special Interest Group (PCI-SIG) manages a number of PCI specifications, including the PCI Express Base Specification, Revision 1.0a, Apr. 15, 2003, as open industry standards, and provides the specifications to its members.

A PCI Express ("PCIe") fabric includes a single host processor (also referred to as the "root complex") that controls a global memory address space of a client system (e.g., desktops and laptops) or a server system (e.g., a workstation) having several PCIe devices. For client systems, these PCIe devices include, e.g., graphics, 1394, Gigabit Ethernet, and TV tuner cards. For server systems, the PCIe devices include Ultra320 SCSI RAID cards, Fibre Channel host bus adapters (HBAs), and 1- and 10-Gigabit Ethernet cards, to name a few. Upon power-up and enumeration process, the root complex interrogates the entire system by traversing through the hierarchical tree-topology and locates all PCIe devices that are connected in the system. An address space is allocated by the host processor for each PCIe device in the global memory address space in order for the host processor to communicate to it.

Two PCIe devices communicate by first passing data from an originating PCIe device up to the root complex through the address space allocated to the originating PCIe device. The data is then moved to the address space of a destination PCIe device by the host processor and subsequently traverses down to the destination PCIe device. Such communication is not considered to be a direct peer-to-peer relationship between the two PCIe devices but an indirect one managed by the host processor.

PCIe was designed to be fully compatible with the widely used PCI local bus standard. PCI is beginning to hit the limits of its capabilities, and while extensions to the PCI standard have been developed to support higher bandwidths and faster clock speeds, these extensions may be insufficient to meet the rapidly increasing bandwidth demands of PCs in the near future. With its high-speed and scalable serial architecture, PCIe may be an attractive option for use with or as a possible replacement for PCI in computer systems. PCIe is suited for providing scalability in systems with a single host processor with a number of PCIe devices. Since all communication is under the control of a single host processor, the PCIe architecture is generally not well suited for a large application space that includes multi-host and peer-to-peer communication. Advanced Switching (AS) is a technology which is based on the PCIe architecture, and which enables standardization of various backplane architectures. AS utilizes a packet-based transaction layer protocol that operates over the PCIe physical and data link layers. The AS architecture provides a number of features common to multi-host, peer-to-peer communication devices such as blade servers, clusters, storage arrays, telecom routers, and switches. These features include support for flexible topologies, packet routing, congestion management (e.g., credit-based flow control), fabric redundancy, and fail-over mechanisms. The Advanced Switching Interconnect Special Interest Group (ASI-SIG) is a collaborative trade organization chartered with providing a switching fabric interconnect standard, specifications of which, including the Advanced Switching Core Architecture Specification, Revision 1.0, December 2003 (available from the ASI-SIG at www.asi-sig.com), it provides to its members.

BRIEF DESCRIPTION OF THE DRAWINGS

FIG. 1a is a block diagram of a PCIe switch.
FIGS. 2a and 2b are diagrams of protocol stacks.
FIG. 3 is a diagram of an AS transaction layer packet (TLP) format.
FIG. 4 is a diagram of an AS route header format.

DETAILED DESCRIPTION

Figure 1:
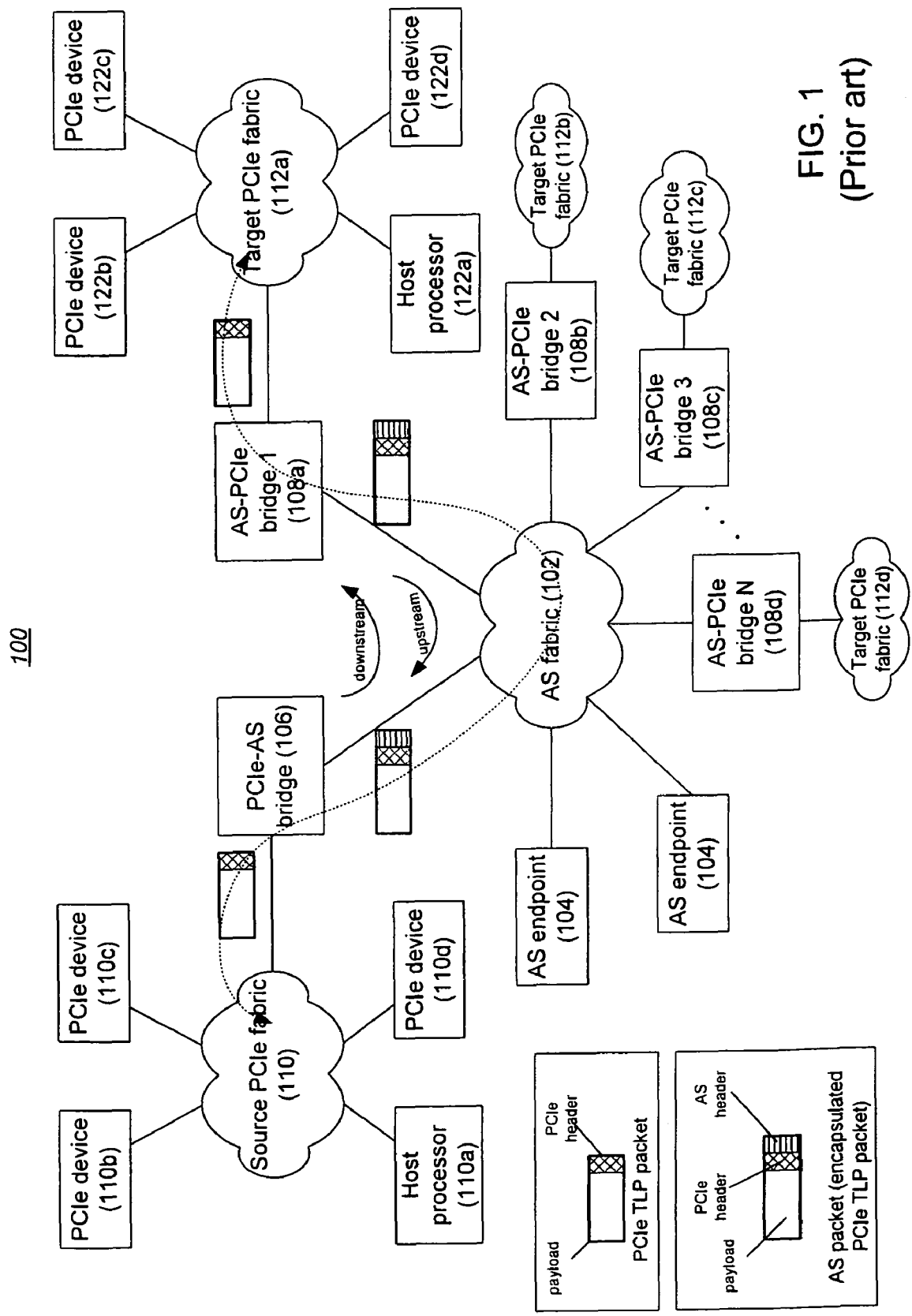
FIG. 1 is a block diagram of a switched fabric network.

FIG. 1 shows a switched fabric network 100 that includes an Advanced Switching (AS) fabric 102. The network 100 includes AS switch elements (not shown) within the AS fabric 102 and AS endpoints 104 (e.g., CPU chipsets, network processors, digital signal processors, media access and host adaptors) residing on the edge of the AS fabric 102. The AS switch elements constitute internal nodes of the AS fabric 102 and provide interconnects with other AS switch elements and AS endpoints 104.

The AS endpoints 104 represent data ingress and egress points for the switch fabric. Some of these AS endpoints 104 can encapsulate and/or translate packets entering and exiting the AS fabric 102 through its internal protocol interfaces (PIs) and may be viewed as "bridges" between the AS fabric and other communication infrastructures, e.g., a source PCIe fabric 110 and a target PCIe fabric 112a-d. Each PCIe fabric 110, 112a-d contains a host processor (e.g., host processors 110a, 122a of PCIe fabrics 110, 112, respectively) and one or more PCIe devices (e.g., PCIe devices 110b-110d, 122b-122d of PCIe fabrics 110, 112a, respectively).

To distinguish between bridge-type AS endpoints and non-bridge-type AS endpoints (e.g., a fabric manager), the term "PCIe-AS bridge" 106 is used to refer to an AS endpoint that bridges the source PCIe fabric 110 to the AS fabric 102, and the term "AS-PCIe bridge" 108a-108d is used to refer to an AS endpoint that bridges the AS fabric 102 to a target PCIe fabric 112a-112d. Each PCIe-AS bridge 106 includes a PI-8 host switch and each AS-PCIe bridge 108a-108d includes a PI-8 I/O switch. The PI-8 host and I/O switches are compliant to the PCI-Express to Advanced Switching Bridge Architecture Specification, Revision 1.0, February 2004 (available from the ASI-SIG at www.asi-sig.org) and function as PCIe switches.

FIG. 1a shows a block diagram of a PCIe switch that is compliant to the PCI Express Base Specification. The PCIe switch includes a logical assembly of multiple virtual PCI-to-PCI bridges, where each virtual PCI-to-PCI bridge is compliant to the PCI-to-PCI Bridge Architecture Specification, Revision 1.2, June 2003 (available from the PCI-SIG at www.pcisig.org). As described in more detail below with reference to FIG. 5, a PI-8 host switch 510 logically implements the functionality of the PCIe switch of FIG. 1a through a combination of a downstream tunneling processor, an upstream tunneling processor, and a PCIe configuration space.

To facilitate communication between the source PCIe fabric 110 and the target PCIe fabric 112a, an encapsulation-tunneling-extraction process can be performed on a PCIe transaction layer packet (TLP) packet by the PCIe-AS bridge 106 and the I/O switch 108a. In one example described in more detail below with reference to FIG. 5, a PCIe TLP packet generated by a source PCIe device 110b (and destined for a target PCIe device 112b) is encapsulated at the PCIe-AS bridge 106 by attaching an AS route header to form an AS packet. The AS packet is tunneled across the AS fabric 102 to the AS-PCIe bridge 108a using a path defined by the AS route header. The AS-PCIe bridge 108a receives the AS packet, strips the AS packet of it's AS route header to extract the original PCIe TLP packet, and forwards the extracted PCIe TLP packet to the target PCIe device 112b through the PCIe fabric 112a.

Although the example refers specifically to performing an encapsulation-tunneling-extraction process on a PCIe TLP packet, packets of other protocols, such as Ethernet, Fibre Channel, and Infiniband, can also be tunneled through the AS fabric 102. A mixture of protocols can be simultaneously tunneled through a single, universal AS fabric making it a powerful and desirable feature for next generation modular applications, such as media gateways, broadband access routers, and blade servers.

Each AS switch element and AS endpoint 104 (bridge and non-bridge) has an AS interface that is part of the AS architecture defined by the Advanced Switching Core Architecture Specification, Revision 1.0, December 2003 (available from the ASI-SIG at www.asi-sig.com). The AS architecture utilizes a packet-based transaction layer protocol ("AS transaction layer" 206) that operates over the PCIe physical and data link layers 202, 204, as shown in FIG. 2a, or operates over separate AS physical and data link layers 208, 210, as shown in FIG. 2b.

AS uses a path-defined routing methodology in which the source of an AS packet provides all information required by a switch (or switches) to route the AS packet to the desired destination. FIG. 3 shows an AS transaction layer packet (TLP) format 300. The AS packet includes an AS header 302 and an encapsulated packet payload 304. The AS header 302 contains the information (i.e., "the path") that is necessary to route the AS packet through the AS fabric 102, and a field that specifies the Protocol Interface (PI) of the AS payload 304. AS switch elements route AS packets using the information contained in the AS header 302 without necessarily requiring interpretation of the contents of the AS payload 304.

A path may be defined by the turn pool 402, turn pointer 404, and direction flag 406 in the AS header 302, as shown in FIG. 4. An AS packet's turn pointer indicates the position of the switch's "turn value" within the turn pool. When an AS packet is received, the AS switch element extracts the packet's turn value using the turn pointer, the direction flag, and the switch's turn value bit width. The extracted turn value for the AS switch element is used to calculate the egress port.

The PI field in the AS route header 302 determines the format of the encapsulated packet payload 304. The PI field is inserted by the AS endpoint 104 that originates the AS packet and is used by the AS endpoint 104 that terminates the AS packet to correctly interpret the packet contents. The separation of routing information from the remainder of the AS packet enables the AS fabric 102 to tunnel packets of any protocol.

PIs represent fabric management and application-level interfaces to the AS network 100. Table 1 provides a list of PIs currently supported by the AS Specification.

TABLE 1

| PI number | Protocol Encapsulation Identity (PEI) |
|---|---|
| 0 | Path Building |
| (0:0) | (Spanning Tree Generation) |
| (0:1-127) | (Multicast) |
| 1 | Congestion Management (Flow ID messaging) |
| 2 | Transport Services |
| 3 | Reserved for future AS Fabric Management Interfaces |
| 4 | Device Management |
| 5 | Event Reporting |
| 6 | Reserved for future AS Fabric Management Interfaces |
| 7 | Reserved for future AS Fabric Management Interfaces |
| 8 | PCI-Express |
| 9-95 | ASI-SIG defined PIs |
| 95-126 | Vendor-defined PIs |
| 127 | Invalid |

PIs 0-7 are used for various fabric management tasks, and PIs 8-126 are vendor-defined interfaces. As shown in Table 1, PI-8 is used to tunnel or encapsulate a native PCIe packet and is discussed in more detail below with reference to FIG. 5.

The AS architecture supports the establishment of direct endpoint-to-endpoint logical paths through the AS fabric known as Virtual Channels (VCs). This enables a single network to service multiple, independent logical interconnects simultaneously, each VC interconnecting AS endpoints 104 for control, management and data. Each VC provides its own queue so that blocking in one VC does not cause blocking in another. Each VC may have independent packet ordering requirements, and therefore each VC can be scheduled without dependencies on the other VCs.

The AS architecture defines three VC types: Bypass Capable Unicast (BVC); Ordered-Only Unicast (OVC); and Multicast (MVC). BVCs have bypass capability, which may be necessary for deadlock free tunneling of some, typically load/store, protocols. OVCs are single queue unicast VCs, which are suitable for message oriented "push" traffic. MVCs are single queue VCs for multicast "push" traffic.

The AS architecture provides a number of congestion management techniques, one of which is a credit-based flow control technique that ensures that AS packets are not lost due to congestion. Link partners (e.g., an AS endpoint 104 and an AS switch element) in the network exchange flow control credit information to guarantee that the receiving end of a link has the capacity to accept AS packets. Flow control credits are computed on a per-VC basis by the receiving end of the link and communicated to the transmitting end of the link. Typically, packets are transmitted only when there are enough credits available for a particular VC to carry the AS packet. Upon sending a packet, the transmitting end of the link debits its available credit account by an amount of flow control credits that reflects the packet size. As the receiving end of the link processes (e.g., forwards to an AS endpoint 104) the received AS packet, space is made available on the corresponding VC and flow control credits are returned to the transmission end of the link. The transmission end of the link then adds the flow control credits to its credit account.

The AS architecture supports the implementation of an AS Configuration Space in each AS device (e.g., AS endpoint 104) in the network 100. The AS Configuration Space is a storage area that includes fields to specify device characteristics as well as fields used to control the AS device. The AS Configuration Space includes up to 16 apertures where configuration information can be stored. Each aperture includes up to 4 Gbytes of storage and is 32-bit addressable. The configuration information is presented in the form of capability structures and other storage structures, such as tables and a set of registers. Table 2 provides a set of capability structures ("AS Native Capability Structures") that are defined by the AS Specification and stored in aperture 0 of the AS Configuration Space.

TABLE 2

AS Native Capability Structures

| AS Native Capability Structure | AS Endpoints | AS Switch Elements |
| --- | --- | --- |
| Baseline Device | R | R |
| Spanning Tree | R | R |
| Spanning Tree Election | O | N/A |
| Switch Spanning Tree | N/A | R |
| Device PI | O | O |
| Scratchpad | R | R |
| Doorbell | O | O |
| Multicast Routing Table | N/A | O |
| Semaphore | R | R |
| AS Event | R | R |
| AS Event Spooling | O | N/A |
| AS Common Resource | O | N/A |
| Power Management | O | N/A |
| Virtual Channels | R w/OE | R w/OE |
| Configuration Space Permission | R | R |
| Endpoint Injection Rate Limit | O | N/A |
| Status Based Flow Control | O | O |
| Minimum Bandwidth Scheduler | N/A | O |
| Drop Packet | O | O |
| Statistics Counters | O | O |
| Transport Services | O | N/A |
| Integrated Devices | O | N/A |
| PIO Translation | O | N/A |

Legend:
O = Optional normative
R = Required
R w/OE = Required with optional normative elements
N/A = Not applicable The information stored in the AS Native Capability Structures are accessible locally and/or globally if the appropriate permissions are given. Generally, the permissions are controlled via global enable bits and local enable bits. Each global enable bit either enables or disables global access to an aperture of the AS Configuration Space, i.e., setting a global enable bit to 1 allows access to the aperture from any other device in the AS fabric. Likewise, each local enable bit enables or disables local access to an aperture of the AS Configuration Space, i.e., setting a local enable bit to 1 allows access to the aperture from a local processor. The primary and secondary fabric managers always have read and write permissions for all apertures.

In one implementation of a switched fabric network 100, a fabric manager election process may be initiated by a variety of either hardware or software mechanisms to elect one or more fabric managers for the switched fabric network. A fabric manager is an AS endpoint 104 that "owns" all of the AS devices, including itself, in the network 100. If multiple fabric managers, e.g., a primary fabric manager and a secondary fabric manager, are elected, then each fabric manager may own a subset of the AS devices in the network 100. Alternatively, the secondary fabric manager may declare ownership of the AS devices in the network upon a failure of the primary fabric manager, e.g., resulting from a fabric redundancy and fail-over mechanism.

Once a fabric manager declares ownership, it has privileged access to its AS devices' AS Native Capability Structures. In other words, the fabric manager has read and write access to all apertures of the AS Native Capability Structures of all of the AS devices in the network.

As previously discussed, the AS Native Capability Structures of an AS device are accessible through PI-4 packets. Accordingly, each AS device in the network 100, including the PCIe-AS bridge 106, can be implemented to include an AS PI-4 unit for processing PI-4 packets received through the network from, e.g., a fabric manager.

Figure 5:
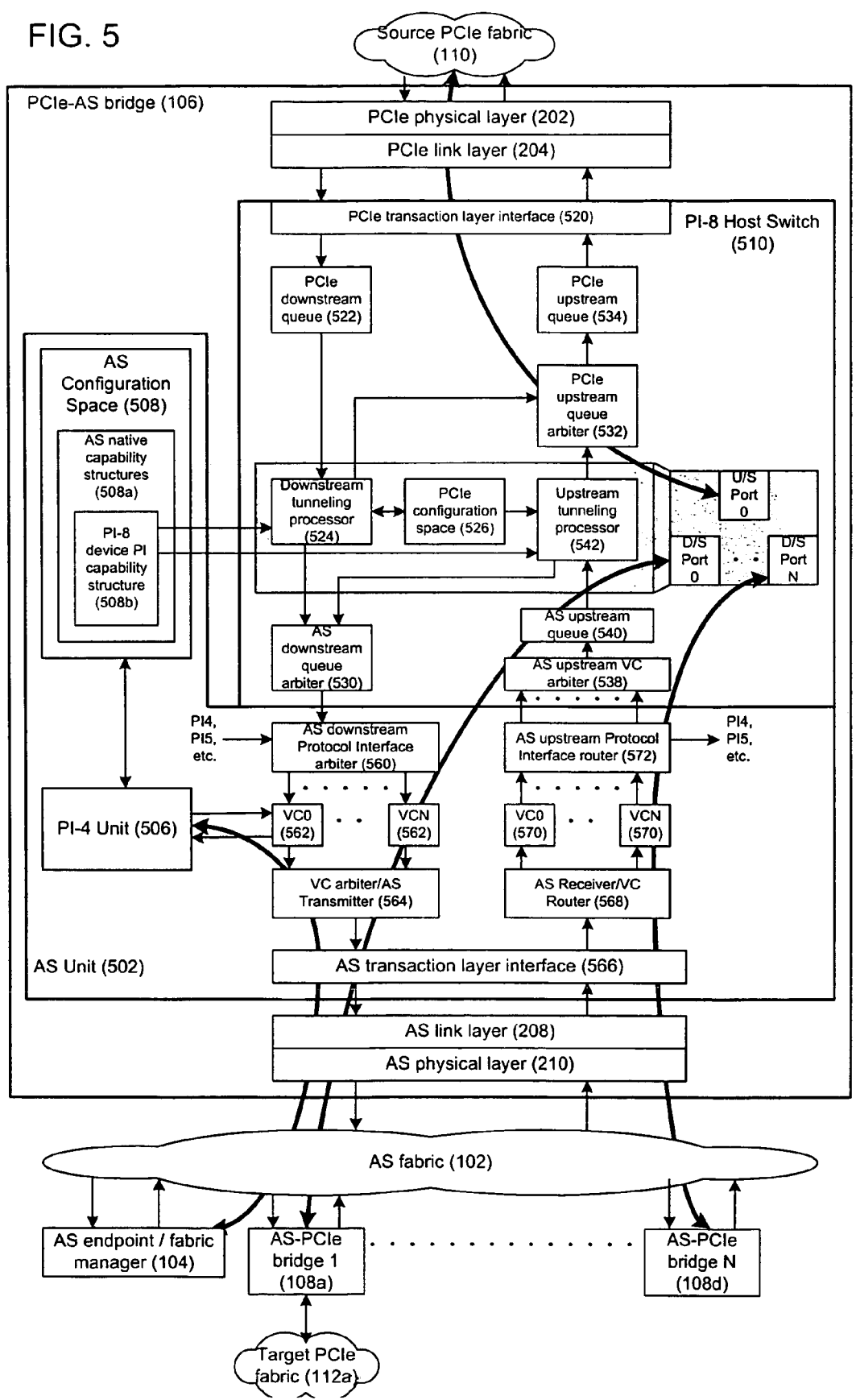
FIG. 5 is a diagram of a PCIe-AS bridge with a PI-8 host switch.

Referring to FIG. 5, the PCIe-AS bridge 106 includes an AS unit 502 that implements the AS transaction layer 206 operating over the AS physical layer 210 and AS data link layer 208. In one example, the AS unit 502 includes a PI-4 unit 506, and an AS Configuration Space 508 including one or more AS Native Capabilities Structures 508a.

PI-4 packets received at the PCIe-AS bridge 106 over the AS fabric 102 are passed from the AS physical layer 210 and AS data link layer 208 to the PI-4 unit 506 for processing through the AS transaction layer interface 566. Upon receipt of a PI-4 packet, the PI-4 unit 506 may perform one or more packet validation operations prior to processing the packet. In one example, the PI-4 unit 506 performs a configuration space permissions check to determine whether the AS endpoint 104, e.g., a fabric manager or any device on the fabric (if the global write enable bit has been set for that aperture), from which the PI-4 packet originated has the appropriate permission, e.g., a write permission, to access the AS Native Capability Structures 508a of the PCIe-AS bridge 106. If the PI-4 packet is invalid, the PI-4 unit 506 discards the PI-4 packet, generates an error signal, and sends the error signal to a processor external to the PI-4 unit 506. In one implementation, the external processor (not shown) generates a PI-5 (event notification) packet in response to the error signal.

If the received PI-4 packet is valid, the PI-4 unit 506 identifies the packet type using the field values associated with an Operation Type field in the AS route header. Table 3 shows how a packet is identified using the Operation Type field.

TABLE 3

PI-4 packet types

| PI-4 Packet Type | Operation Type |
| --- | --- |
| Write | 000 |
| Read Request | 100 |
| Read Completion with Data | 101 |
| Read Completion with Error | 111 |

If the valid PI-4 packet is identified as a write packet, the PI-4 unit 506 processes a write command to write data, e.g., extracted from the payload of the received PI-4 packet, to a location in an AS Native Capability Structure 508a specified by an aperture number and address in the received PI-4 packet header. In one example, the fabric manager 512 configures bindings between the PCIe-AS bridge 106 and the AS-PCIe bridges 108a-108d via PI-4 packets, where the bindings are defined in one or more sets of binding registers stored in a PI-8 device PI Capability Structure 508b that is part of the AS Native Capability Structure 508a. Each binding register provides path information binding a downstream port of the PCIe switch (being logically implemented by a PI-8 host switch 510 of the PCIe-AS bridge 106) with an I/O switch of an AS-PCIe bridge 108a-108d. The path information is used by the PI-8 host switch 510 of the PCIe-AS bridge 106 to construct a correct AS header and to perform path protection checks as described below.

PCIe TLP packets (e.g., PCIe Memory TLP packets, PCIe I/O TLP packets, PCIe Configuration TLP packets, and PCIe Message TLP packets) are received at the PI-8 host switch 510 from the source PCIe fabric 110 through the PCIe physical layer 202, PCIe data link layer 204, and the PCIe transaction layer interface 520. A PCIe downstream queue 522 connected to the PCIe transaction layer interface 520 provides buffer space for downstream PCIe TLP packets. The PCIe downstream queue 522 adheres to standard PCI transaction ordering rules requiring posted transactions pass non-posted transactions in the case of blocked non-posted transactions. Non-posted transactions may be blocked in the AS Unit 502 by a lack of bypassable credits available at the AS transmitter 564. In the absence of blocking conditions, PCIe transactions are presented to the downstream tunneling processor 524 in the order they are received.

Upon receipt of a PCIe packet, the downstream tunneling processor 524 performs a series of checks as specified in the PCI-Express to Advanced Switching Bridge Architecture Specification. For example, a packet forwarding check is performed to determine the destination path of the PCIe TLP packet within the AS fabric 102. The downstream tunneling processor 524 uses the format and type fields of the PCIe TLP packet to determine the destination memory space (memory, I/O, configuration, message, or completion), which selects an appropriate comparison function between registers in PCIe configuration space 526 and the address/routing specifier contained in the PCIe packet. A successful comparison results in the selection of a downstream port to which the PCIe packet is transferred via a virtual internal bus. In the standard PCIe switch of FIG. I a, the PCIe packet would be transferred to a physically unique downstream port instance, consisting minimally of PCIe physical and data link layers, and a transaction layer interface. For the PI-8 host switch 510, which is implemented to logically function as a PCIe switch, traffic routed through each of the downstream ports is physically transported via a single AS physical layer 210, AS data link layer 208, and AS transaction layer 206 stack. To accomplish this, the downstream tunneling processor 524 pre-pends a unique AS header that routes the encapsulated PCIe packet through the AS fabric 102 to the destination I/O switch at an AS-PCIe bridge 108a-108d. Since the PCIe packet is not physically transferred from an upstream port to a downstream port, all downstream packet validation and routing functions are performed by the downstream tunneling processor 524 for all ports in the PI-8 host switch 510.

For PCIe configuration TLP's, the downstream tunneling processor 524 identifies the packet's configuration type (i.e., Type 0 or Type 1). For PCIe Type 0 configuration TLP packets, the downstream tunneling processor 524 either writes the payload of the packet or reads data to/from the register in the upstream port's PCIe configuration space 526 specified by the register number field of the PCIe configuration TLP, and returns a PCIe completion TLP to the requester via the PCIe upstream queue arbiter (532). For PCIe Type 1 configuration TLP packets, the downstream tunneling processor 524 compares the bus number field of the PCIe configuration TLP to the secondary bus number field of the upstream port PCIe configuration space 526. If a match occurs, the downstream tunneling processor 524 either writes the payload of the packet or reads data to/from the register in the downstream port's PCIe configuration space 526 specified by the device and register number fields of the PCIe configuration TLP, and returns a PCIe completion TLP to the requester via the PCIe upstream queue arbiter 532. If the bus number field of PCIe Type 1 configuration TLP matches one of the downstream port's secondary bus number fields, the Type 1 configuration cycle is converted to a Type 0 configuration cycle, an appropriate AS header is pre-pended to the PCIe TLP, and the encapsulated PCIe configuration TLP is transferred to the AS transaction layer 206 for transmission on the AS fabric 102. If the bus number field of the PCIe Type 1 configuration TLP falls within one of the bus number windows defined by the secondary (exclusive) and subordinate (inclusive) bus numbers in one of the downstream port's PCIe configuration space 526, then an appropriate AS header is pre-pended to the PCIe TLP, and the encapsulated PCIe configuration TLP is transferred, unchanged, to the AS transaction layer 206 for transmission on the AS fabric 102. Failing all these checks, the downstream tunneling processor 524 will generate an unsupported request PCIe completion TLP to the requester via the PCIe upstream queue arbiter 532, and error handling as specified in the PCI-Express to Advanced Switching Bridge Architecture Specification is performed.

For PCIe memory TLP's, the downstream tunneling processor 524 compares the address field of the PCIE TLP to the memory windows defined by the memory base and memory limit fields, as well as the prefetchable memory base/limit fields, contained in the upstream port's PCIE configuration space 526. If the PCIe TLP falls within one of these memory windows the PCIE TLP is forwarded from the upstream port's primary to secondary interface, which is the virtual internal bus of the PI-8 host switch 510. Next, the PCIE memory TLP's address field is compared to each downstream port's memory windows defined by the memory and prefetchable memory base and limit fields in PCIe configuration space 526. A match may occur on one and only one downstream port memory window, which selects the downstream port, the appropriate AS header is pre-pended to the PCIe memory TLP, and the encapsulated PCIe memory TLP is transferred to the AS transaction layer 206 for transmission on the AS fabric 102. Failure to pass memory forwarding rules in either the upstream or the downstream ports results in the downstream tunneling processor employing the error handling specified by the PCI-Express to Advanced Switching Bridge Architecture Specification, including returning unsupported request PCIe completion TLP's to the requester via the PCIe upstream queue arbiter 532, generating system error messages via the PCIe upstream queue arbiter 532, and setting appropriate bits in PCIe configuration space 526.

For PCIe I/O TLP's, the downstream tunneling processor 524 compares the address field of the PCIe TLP to the memory window defined by the I/O base and limit fields contained in the upstream port's PCIe configuration space 526. If the PCIe TLP falls within this window the PCIe TLP is forwarded from the upstream port's primary to secondary interface, which is the virtual internal bus of the PI-8 host switch 510. Next, the PCIe I/O TLP's address field is compared to each downstream port's memory windows defined by the I/O base and limit fields in PCIe configuration space 526. A match may occur on one and only one downstream port memory window, which selects the downstream port, the appropriate AS header is pre-pended to the PCIe I/O TLP, and the encapsulated PCIe I/O TLP is transferred to the AS transaction layer 206 for transmission on the AS fabric 102. Failure to pass 110 forwarding rules in either the upstream or the downstream ports results in the downstream tunneling processor employing the error handling specified by the PCI-Express to Advanced Switching Bridge Architecture Specification, including returning unsupported request PCIe completion TLP's to the requester via the PCIe upstream queue arbiter 532, generating system error messages via the PCIe upstream queue arbiter 532, and setting appropriate bits in PCIe configuration space 526.

For PCIe completion TLP's, the downstream tunneling processor 524 compares the bus number sub-field of the Requester ID field in the PCIe TLP to the secondary (exclusive) and subordinate (inclusive) bus numbers contained in the upstream port's PCIe configuration space. If the PCIe completion TLP falls within the bus number window, the PCIe TLP is forwarded from the upstream port's primary to secondary interface, which is the virtual internal bus of the PI-8 host switch 510. Next, the bus number sub-field of the Requester ID field in the PCIe TLP is compared to each downstream port's secondary (inclusive) and subordinate (inclusive) bus numbers. A match occur on one and only one downstream port bus number window, which selects the downstream port, the appropriate AS header is pre-pended to the PCIe completion TLP, and the encapsulated PCIe completion TLP is transferred to the AS transaction layer 206 for transmission on the AS fabric 102. Failure to pass completion forwarding rules in either the upstream or the downstream ports results in the downstream tunneling processor employing the error handling specified by the PCI-Express to Advanced Switching Bridge Architecture Specification.

For PCIe message TLP's, the downstream tunneling processor 524 evaluates the message routing subfield of the Type field and the Message Code field of the PCIe TLP. The message code field identifies INTx interrupt signaling, power management, error signaling, locked transactions, slot power limit, vendor defined, and hot-plug message types. The downstream tunneling processor 524 handles each of these message types in accordance with the PCI-Express to Advanced Switching Bridge Architecture and the PCI Express Base Specifications.

The downstream tunneling processor 524 prepends an AS header to all PCIe TLP packets that are transferred to the AS transaction layer 206 for transmission on the AS fabric 102. Table 4 summarizes how each bit field of an example AS header is generated.

TABLE 4

AS Header Field Generation

| AS Header Field | Bit Position | Source |
| --- | --- | --- |
| Primary PI | [6:0] | Hardcoded to 7'b000_1000 - Only generates PI-8 traffic |
| Perishable | 7 | Hardcoded to 1'b0 - PI-8 traffic is not perishable |
| Packet CRC Enable | 8 | Follows the rules from the AS Core Specification, though use of the AS PCRC by PI-8 bridges does not provide end-to-end coverage from the Base source to Base destination. |
| Traffic Class | [11:9] | Generated from the traffic class field of the base packet, except when the base packet TC is 7 h. In this case the AS TC value used must be 6 h. |
| Ordered Only | 12 | Hardcoded to 1'b0 - PI-8 traffic must be carried on bypassable Virtual Channels |
| Type Specific | 13 | This bit is set to 1 when the encapsulated base packet is a read (Memory, I/O or Configuration) or a non-posted write (I/O or Configuration) to indicate that the packet is bypassable. This bit is set to 0 for a posted write (Memory Write or Message) to indicate that the packet is ordered (not bypassable). This bit is cleared on all completion packets, as completion packets are not bypassable. |
| Credits Required | [18:14] | Packet length in 64 byte increments include the entire base packet plus AS Header. |
| FECN | 19 | Hardcoded to 1'b0 - Congestion management mechanisms not implemented in PI-8 unit. |

TABLE 4-continued

AS Header Field Generation

| AS Header Field | Bit Position | Source |
| --- | --- | --- |
| Turn Pointer | [24:20] | Sourced from the request turn pool pointer field in the PI-8 Device PI AS capability structure for the selected downstream port for all downstream PCIe TLP types except completions. This field is hardcoded to 5'b0_0000 for PCIe completion TLP's. |
| Header CRC | [31:25] | This field is calculated in the AS transaction layer for all downstream PI traffic. |
| Turn Pool | [62:32] | Sourced from the request turn pool field in the PI-8 Device PI AS capability structure for the selected downstream port for all downstream PCIe TLP types except completions. For PCIe completion packets, this field is sourced from the completion turn pool field in the PI-8 Device PI AS capability structure for the selected downstream port. |
| Direction | 63 | 1'b0 (forward routed) for all downstream PCIe types except completions. 1'b1 (backward routed) for PCIe completion TLP's. |

The downstream tunneling processor 524 encapsulates PCIe TLP's by prepending an appropriate AS header, and transfers the encapsulated packet to the AS downstream Protocol Interface arbiter 560 in the AS transaction layer 206 through the AS downstream queue arbiter 530. The transfer interface consists of a VC indicator, which is used by the AS downstream Protocol Interface arbiter 560 to direct the packet to the appropriate downstream virtual channel 562. The VC arbiter/AS transmitter unit 564 selects a VC for transmission based on an arbitration algorithm and available credit, and transfers the packet to the AS fabric 102 via the AS data link layer 208 and physical layer 210 through the AS transaction layer interface 566. The packet is received at the destination I/O switch at a AS-PCIe bridge 108*a*-108*d*, where the received packet is de-encapsulated, and the PCIe TLP is routed to the target PCIe fabric 112*a*-112*d*.

AS packets received at the AS unit 502 from the AS fabric 102 pass through the AS physical layer 210 and data link layer 208 to the AS ReceiverNVC router unit 568 in the AS transaction layer 206 through the AS transaction layer interface 566. The AS Receiver 568 performs basic AS packet checks (e.g., HCRC, PCRC, etc) and the VC router 568 pushes the received packet into one of the receive virtual channel queues 570. The AS upstream protocol interface router 572 routes the packet at the head of each VC queue to the appropriate PI processing engine. For AS PI-8 packets, the AS upstream protocol interface router 572 routes PI-8 packets at the head of each VC to the AS upstream VC arbiter 538. The AS upstream VC arbiter 538 arbitrates access from multiple VC sources to the single AS upstream queue 540, which provides buffer space for incoming AS packets so that the AS packets can be removed from the receive virtual channels 570 as quickly as possible. There is inherent latency involved in processing the AS PI-8 packets, and having the AS upstream queue 540 in the PI-8 unit 510 shields this latency from the AS fabric 102, thus allowing flow control credits to be made available quickly to the AS unit's link partner. The AS upstream queue 540 can be implemented as a first-in-first-out (FIFO) structure that presents AS packets to an upstream tunneling processor 542 in the order it receives them.

Upon receipt of an AS PI-8 packet, the upstream tunneling processor 542 performs a series of checks as specified in the PCI-Express to Advanced Switching Bridge Architecture Specification. Two types of packet checks are performed by the upstream tunneling processor 542—AS packet checks and PCIe packet checks. AS packet checks essentially verify AS header validity. For example, the upstream tunneling processor 542 uses turn pool information stored in the PI-8 device PI Capability Structure 508*b* to perform a path protection check to ensure that the PI-8 packet originated at an I/O switch at a AS-PCIe bridge 108*a*-108*d* that is properly bound to the PI-8 host switch 510. The upstream tunneling processor 542 then performs forwarding checks based on PCIe TLP payload of the AS PI-8 packet. In general, the PI-8 host switch 510 is attached to the root complex of a PCI hierarchical tree, and upstream configuration and I/O type TLP are illegal. Therefore, the typical upstream PCIe TLP types are memory, completions, and messages. Failure to pass either the upstream AS PI-8 or PCIe packet validity checks results in the upstream tunneling processor 542 employing the error handling specified by the PCI-Express to Advanced Switching Bridge Architecture Specification. This includes generating AS PI-5 event packets to the originator of the packet messages via a PI-5 interface, returning AS encapsulated unsupported request PCIe completion TLP's to the requester via the PCIe downstream queue arbiter 530, generating upstream PCIe messages via the upstream queue arbiter 532, and setting appropriate bits in PCIe configuration space 526.

For upstream PCIe memory TLP's, the upstream tunneling processor 542 compares the address field of the PCIe TLP to the memory windows defined by the memory base and memory limit fields, as well as the prefetchable memory base/limit fields, contained in the received downstream port's PCIe configuration space 526. If the PCIe TLP address falls outside all of these memory windows the PCIe TLP is forwarded from the received downstream port's secondary to primary interface, which is the virtual internal bus of the PI-8 host switch 510. Next, the PCIe memory TLP's address field is compared to the upstream port's memory windows defined by the memory and prefetchable memory base and limit fields in the upstream port's PCIe configuration space 526. If the PCIe TLP address falls outside all of the upstream port's memory windows, then the AS header is stripped and the PCIe memory TLP is transferred to the PCIe upstream queue 534 through the PCIe upstream queue arbiter 532.

For upstream PCIe completion TLP's, the upstream tunneling processor 542 compares the bus number sub-field of the Requester ID field in the PCIe TLP to the secondary (inclusive) and subordinate (inclusive) bus numbers contained in the received downstream port's PCIe configuration space 526. If the PCIe completion TLP falls outside the bus number window, the PCIe TLP is forwarded from the downstream port's secondary to primary interface, which is the virtual internal bus of the PI-8 host switch 510. Next, the bus number sub-field of the Requester ID field in the PCIe TLP is compared to the upstream port's secondary (inclusive) and subordinate (inclusive) bus numbers, and if the PCIe TLP request bus number falls outside the upstream port's bus number window, the AS header is stripped and the PCIe memory TLP is transferred to the PCIe upstream queue 534 through the PCIe upstream queue arbiter 532.

For upstream PCIe message TLP's, the upstream tunneling processor 542 evaluates the message routing subfield of the Type field and the Message Code field of the PCIe TLP. The message code field identifies INTx interrupt signaling, power management, error signaling, locked transactions, slot power limit, vendor defined, and hot-plug message types. The upstream tunneling processor 542 handles each of these message types in accordance with the PCI-Express to Advanced Switching Bridge Architecture and the PCI Express Base Specifications.

Upstream PCIe TLP's are transferred to the PCIe fabric 110 via the PCIe link layer 204 and physical layer 202 through the PCIe transaction layer interface 520 from the PCIe upstream queue 534. The PCIe upstream queue 534 adheres to standard PCI transaction ordering rules requiring posted transactions pass non-posted transactions in the case of blocked non-posted transactions. Non-posted transactions may be blocked due to lack of non-posted credits available at the PCIe link partner in the PCIe fabric 110. In the absence of blocking conditions, PCIe transactions are presented to the PCIe transaction layer interface 520 in the order they are received.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), e.g., the Internet, and a wireless network.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A first device operable as a virtual Peripheral Component Interconnect-Express (PCIe) to Advanced Switching (AS) Bridge having an upstream port and N downstream ports, the first device comprising:
    a first interface operatively coupled to a PCIe fabric to pass communication between the PCIe fabric and the first device;
    a second interface operatively coupled to an Advanced Switching Interconnect (ASI) fabric to pass communication between the first device and the ASI fabric;
    an Advanced Switching Configuration Space (ASCP) comprising information related to the device;
    a downstream tunneling processor to
        receive a first packet from the PCIe fabric through the first interface;
        encapsulate the received packet by associating one of N downstream ports with an AS path routing header of the received packet assembled, at least in part, using information in the ASCP, and
        transmit the encapsulated first packet from the PCIe fabric to the AS fabric through the second interface; and
    an upstream tunneling processor to
        receive a second packet from the AS fabric through the second interface,
        associate an AS path routing information in a header of the received second packet with one of N downstream ports assembled, at least in part, using information in the ASCP, and
        transmit the processed second packet from the AS fabric to the PCIe fabric through the first interface.

2. The device of claim 1, further comprising:
    one or more configuration registers, each configuration register defining a memory space of the first device that is associated with a port identifier.

3. The device of claim 2, wherein:
    the memory space associated with a port. identifier comprises at least one of a memory window, an I/O window, and a configuration space.

4. The device of claim 1, further comprising:
    one or more binding registers, each binding register to include path information that binds a downstream port of the first device with a second device on the ASI fabric that is downstream of the first device.

5. The device of claim 1, further comprising:
    a PCIe downstream queue disposed between the first interface and the downstream tunneling processor, the PCIe downstream queue to provide buffer space for packets received over the PCIe fabric.

6. The device of claim 5, wherein:
    the PCIe downstream queue comprises a first-in-first-out (FIFO) data structure.

7. The device of claim 1, further comprising:
    an upstream queue in communication with the downstream tunneling processor and the upstream tunneling processor, the upstream queue to provide buffer space for PCIe TLP to be transmitted over the PCIe fabric.

8. The device of claim 7, further comprising:
    an upstream queue arbiter in communication with the downstream tunneling processor and the upstream tunneling processor, the upstream queue arbiter to arbitrate access to the upstream queue between the downstream tunneling processor and the upstream tunneling processor.

9. The device of claim 1, further comprising:
    a downstream queue arbiter in communication with the downstream tunneling processor and the upstream tunneling processor, the downstream queue arbiter to arbitrate access to the second interface between the downstream tunneling processor and the upstream tunneling processor.

10. The device of claim 1, wherein the downstream tunneling processor identifies one of a plurality of memory spaces of the first device as a destination of a PCIe transaction layer packet (TLP) based on information in format and type fields of the PCIe TLP.

11. A method comprising:
    at a first device operable as a virtual Peripheral Component Interconnect-Express (PCIe) to Advanced Switching (AS) Bridge having an upstream port and N downstream ports,
    processing a PCIe transaction layer packet (TLP) received over a PCIe fabric for transmission over an Advanced Switching Interconnect (ASI) fabric, the processing of the PCIe TLP comprising:
        receiving the PCIe TLP from the PCIe fabric;
        encapsulating the received PCIe TLP by associating one of N downstream ports with an AS path routing header of the PCIe TLP assembled, at least in part, using information in Advanced Switching Configuration Space, and
        transmitting the encapsulated PCIe TLP from the PCIe fabric to the AS fabric; and
    processing an ASI packet received over an ASI fabric for transmission over a PCIe fabric, the processing of the ASI packet comprising:
        receiving the ASI packet from the AS fabric;
        associating an AS path routing information in a header of the ASI packet with one of N downstream ports assembled, at least in part, using information in the Advanced Switching Configuration Space, and
        transmitting the processed ASI packet from the AS fabric to the PCIe fabric.

12. The method of claim 11, wherein the processing further comprises:
    comparing an address identifier of the PCIe TLP with one or more memory spaces associated with port identifiers to determine whether the PCIe TLP is to be forwarded downstream, and if so, selecting a downstream port identifier based on the comparison.

13. The method of claim 11, further comprising using information in format and type fields of the PCIe TLP to identify one of a plurality of memory spaces of the first device as a destination of the PCIe TLP received over the PCIe fabric.

14. A system comprising:
- a PCIe fabric;
- a first device operative as a virtual Peripheral Component Interconnect-Express (PCIe) to Advanced Switching (AS) Bridge having an upstream port and N downstream ports, the first device including:
  - a first interface operatively coupled to the PCIe fabric to pass communication between the PCIe fabric and the first device;
  - a second interface operatively coupled to an Advanced Switching Interconnect (ASI) fabric to pass communication between the first device and the ASI fabric; and
  - a volatile memory operative to store machine-executable instructions to cause a downstream tunneling processor to:
    - receive a first packet from the PCIe fabric through the first interface;
    - encapsulate the received packet by associating one of N downstream ports with an AS path routing header of the received packet assembled, at least in part, using information in the ASCP, and
    - transmit the encapsulated first packet from the PCIe fabric to the AS fabric through the second interface,
  - wherein the machine-executable instructions stored in the volatile memory are operative to cause an upstream tunneling processor to:
    - receive a second packet from the AS fabric through the second interface,
    - associate an AS path routing information in a header of the received second packet with one of N downstream ports assembled, at least in part, using information in the ASCP, and
    - transmit the processed second packet from the AS fabric to the PCIe fabric through the first interface.

15. The system of claim 14, wherein the volatile memory of the device further comprises instructions to cause the downstream tunneling processor to:
compare an address identifier of the PCIe TLP with one or more memory spaces associated with port identifiers to determine whether the PCIe TLP is to be forwarded downstream, and if so, select downstream port identifier based on the comparison.

16. The system of claim 14, wherein the volatile memory of the device further comprises instructions to cause the downstream tunneling processor to use information in format and type fields of the PCIe TLP to identify one of a plurality of memory spaces of the first device as a destination of the PCIe TLP.

* * * * *